US007793165B1

(12) United States Patent
Breau et al.

(10) Patent No.: US 7,793,165 B1
(45) Date of Patent: Sep. 7, 2010

(54) SELECTING AN ADDRESS PROVIDER USING A FAILOVER COUNTER

(75) Inventors: Jeremy R. Breau, Kansas City, MO (US); Ray R. Doerr, Gardner, KS (US); John E. Belser, Olathe, KS (US); Gary Rieschick, East Louisburg, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 372 days.

(21) Appl. No.: 11/853,159

(22) Filed: Sep. 11, 2007

(51) Int. Cl.
*G06F 11/00* (2006.01)

(52) U.S. Cl. .......................... 714/53; 714/4
(58) Field of Classification Search .............. 714/4, 714/53
See application file for complete search history.

(56) References Cited

U.S. PATENT DOCUMENTS 6,014,430 A * 1/2000 Gosney et al. ........... 379/93.12
6,377,677 B1 * 4/2002 Ackerley et al. ............ 379/279
2005/0114492 A1 * 5/2005 Arberg et al. ............... 709/223

OTHER PUBLICATIONS

Cisco Systems, Cisco Home Agent Redundancy and Load Balancing, 2005, White Paper, pp. 1-9.*
Internet RFC/STD/FYI/BCP Archives; RFC 4433 (RFC4433) "Mobile IPv4 Dynamic Home Agent (HA) Assignment," 21 pages, http://www.faqs.org/rfcs/rfc4433.html.

* cited by examiner

*Primary Examiner*—Robert Beausoliel
*Assistant Examiner*—Charles Ehne (57) ABSTRACT

A method and system are provided to select address providers that provide mobile internet protocol devices with addresses for communication. An embodiment of the method includes obtaining an address request having a dynamic indicator and a failover counter. Upon obtaining an address request with the dynamic indicator and the failover counter, associating the failover counter with one or more address providers based on the failover counter. The address request is then communicated to one of the address providers associated with the failover provider.

20 Claims, 5 Drawing Sheets

SELECTING AN ADDRESS PROVIDER USING A FAILOVER COUNTER

INCORPORATION BY REFERENCE OF CO-PENDING APPLICATION

The subject matter of non-provisional application titled "Selecting an Address Provider Using a Dynamic Indicator," Ser. No. 11/852,649, filed Sep. 10, 2007, is herein incorporated by reference.

STATEMENT REGARDING FEDERALLY SPONSORED RESEARCH OR DEVELOPMENT

Not applicable.

SUMMARY

The present invention is defined by the claims below. Embodiments of the present invention provide a system and method for, among other things, selecting address providers that provide mobile internet protocol devices with addresses to use for communication. The present invention has several practical applications in the technical arts including selecting an address provider that is associated with a failover counter presented within an address request. Selecting an address provider based on an associated failover counter may optimize an opportunity for obtaining an address that a mobile internet protocol device may use for communication.

In a first illustrative aspect, one or more computer-readable media having computer-executable instructions embodied thereon that, when executed perform a method for selecting address providers that provide mobile internet protocol devices with addresses to use for communication is provided. The method includes obtaining an address request having a dynamic indicator and a failover counter; associating the failover counter with one or more address providers based on the failover counter; and communicating the address request to one of the one or more address providers associated with the failover counter.

In a second aspect, one or more computer-readable media having computer-executable instructions embodied thereon that, when executed perform a method for selecting address providers that provide mobile internet protocol devices with addresses is provided. The method includes receiving an address reply in response to a first address request having a dynamic indicator and a first failover counter, wherein when the address reply indicates an error, communicating a second address request having the dynamic indicator and a second failover counter.

In a final illustrative aspect, an improved address-provider selector capable of selecting an address provider that provides mobile internet protocol devices with internet protocol addresses for data communications is provided. The improved address-provider selector comprising means for obtaining an address request having a dynamic indicator and a first failover counter; means for associating the first failover counter with one or more first address providers; means for assigning the address request to one of the one or more first address providers associated with the first dynamic indicator; and means for communicating the address request to the assigned address provider.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of individual steps is explicitly described.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

AAA Authentication, Authorization, and Accounting
CD-ROM Compact Disk Read Only Memory
DVD Digital Versatile Discs
EEPROM Electrically Erasable Programmable Read Only Memory
FA Foreign Agent
GPS Global Positioning System
HA Home Agent
IP Internet Protocol
MIP Mobile Internet Protocol
MP3 MPEG-1 Audio Layer 3
PDA Personal Digital Assistant
RAM Random Access Memory
RF Radio Frequency
ROM Read Only Memory
RRQ Registration Request Further, various technical terms are used throughout this description. A definition of such terms can be found in *Newton's Telecom Dictionary* by H. Newton, 21$^{st}$ Edition (2005). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

Embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Figure 1:
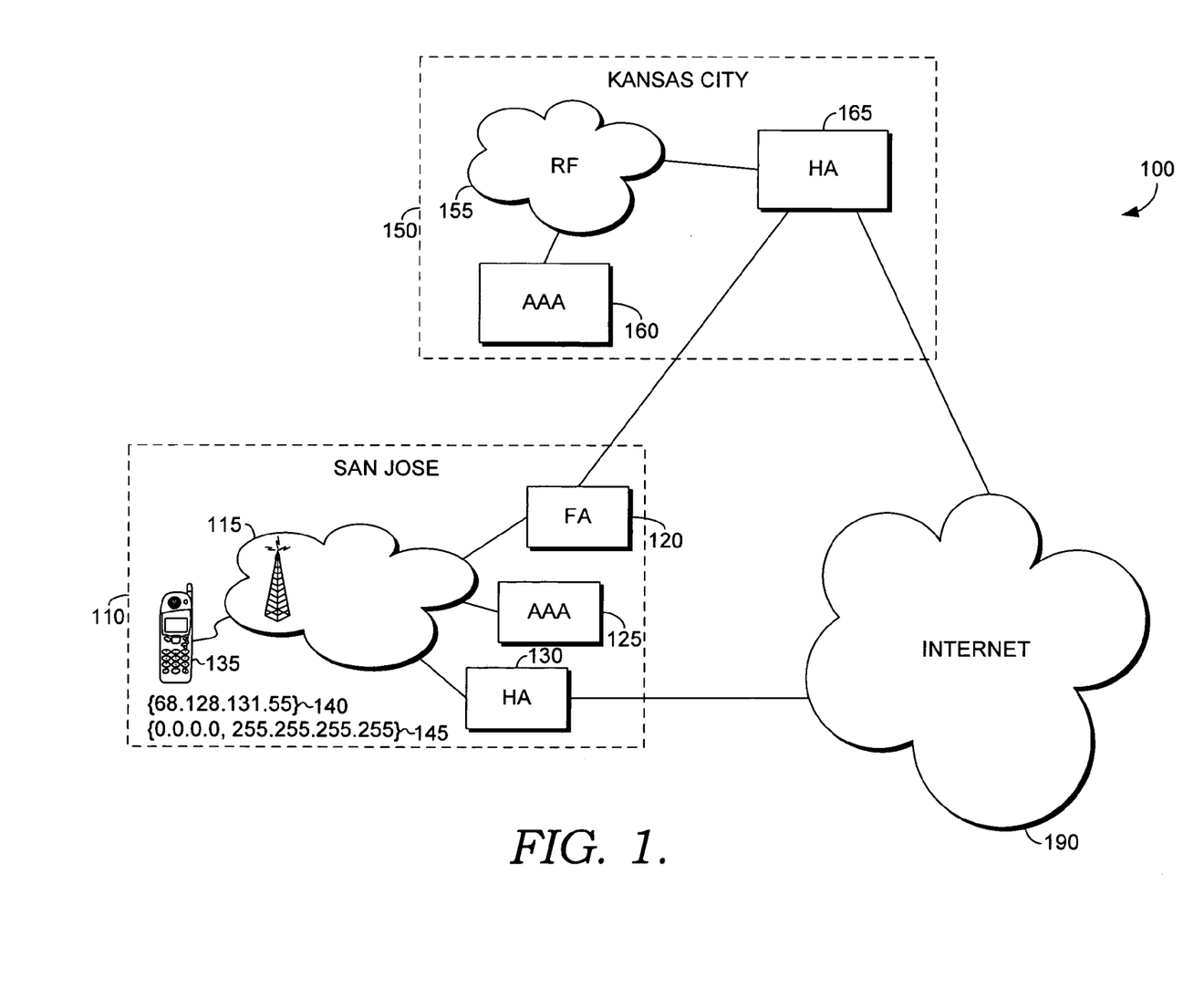
FIG. 1 is a schematic view of an exemplary wireless mobile internet protocol communications environment suitable for use in implementing the present invention.

Referring initially to FIG. 1 in particular, an exemplary wireless mobile internet protocol (MIP) network environment 100 is depicted with a first wireless area 110, a second wireless area 150, and the Internet 190. Using a MIP network environment, MIP devices may change the point-of-attachment to the Internet 190 without changing the IP address. The first wireless area 110 includes a radio frequency (RF) area 115, an FA 120, an AAA 125, a HA 130, and a mobile device 135. Mobile device 135 may have IP addresses 140 or 145 encoded into it. The second wireless area 150 may be similar to first wireless area 110. The second wireless area 150 include an RF area 155, an AAA 160, and a HA 165. Both wireless areas 110 and 150 may represent geographic areas such as cities, metropolitan areas, counties, etc. Different components may be included in first and second wireless areas 110 and 150 than those that are shown. For illustrative purposes here, a subset of devices are illustrated to aid in the explanation of the current state of the art as well as the implementation of the present invention. So, for purposes here, first and second wireless areas 110 and 150 are shown coupled with Internet 190 through their respective HAs 130 and 165.

As discussed above, a user desiring to connect to Internet 190 with mobile device 135 could do so using a static HA assignment approach. In this case, mobile device 135 might have IP address 140 encoded into it signifying an association with a wireless home area. For our example here, we assume mobile device 135 has second wireless area 150 as its home area. Second wireless area 150 is identified as Kansas City. Mobile device 135 may represent a user that is traveling in another wireless area, currently first wireless area 110, identified as San Jose. The user, with mobile device 135, desires to connect to Internet 190. Because mobile device 135 has IP address 140, first wireless area 110 recognizes that mobile device 135 is not one of its own mobile devices. Therefore, FA 120 uses IP address 140 to create a communication tunnel back to mobile device 135's home area to HA 165. HA 165 establishes a connection to Internet 190 to enable mobile device 135 to connect to Internet 190. For purposes here, the explanation of the static HA assignment has been simplified to illustrate the inefficient use of backhauling a connection of a mobile device back to its wireless home area in order to establish a communication connection to the Internet. As can be seen, if thousands of these connections are created, congestion and overload conditions can easily occur across various wireless networks.

Continuing with the example above, a user desiring to connect to Internet 190 with mobile device 135 could also do so using a dynamic HA assignment. In this case, rather than have IP address 140 embedded into mobile device 135, IP address 145 might be embedded into mobile device 135. As shown, IP address 145 illustrates two IP addresses which, if used, would signify to another device that mobile device 135 should not establish a backhaul connection back to its home wireless areas. Instead, the local wireless area should try to establish the necessary connections to enable mobile device 135 to connect to Internet 190. In our scenario, the presence of IP address 145 in mobile device 135 indicates that dynamic HA assignment shall occur. Therefore, FA 120 is not used to create a communication tunnel back to HA 165. Instead, FA 120 interacts with AAA 125 to select an HA 130 to provide a user with Internet 190. In this way, FA 120 does not have to make a backhaul connection to mobile device 135's home wireless area before connecting to the Internet 190. Such a wireless MIP network utilizing the dynamic HA assignment approach provides an exemplary communication environment, in accordance with an embodiment of the present invention.

Figure 2:
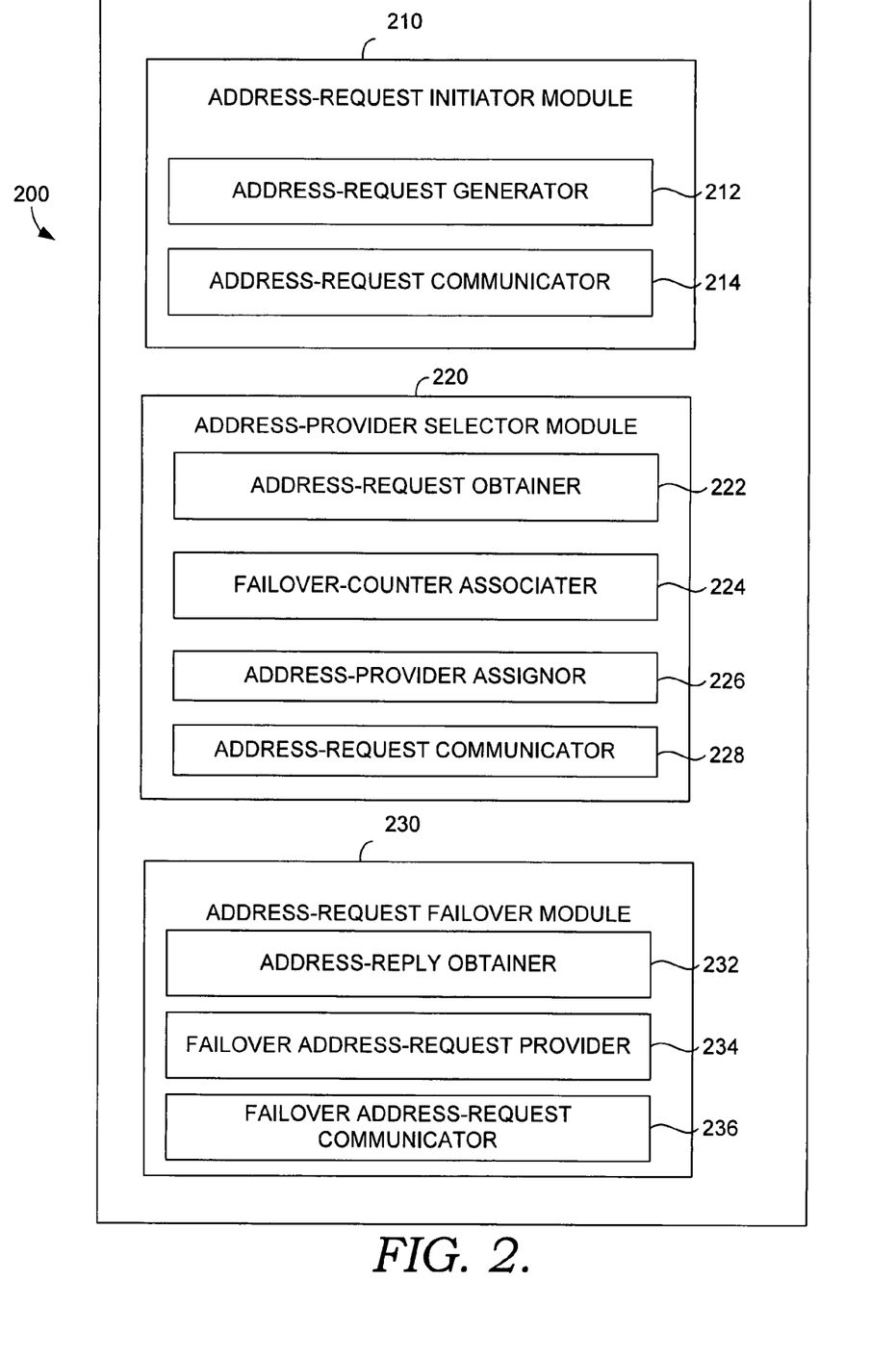
FIG. 2 is a block diagram depicting an exemplary computing system for selecting an address provider, in accordance with an embodiment of the present invention.

Referring now to FIG. 2, an exemplary computing system 200 for selecting address providers within a wireless MIP network that utilizes the dynamic assignment approach is illustrated. As used herein, an address provider provides an address so that a MIP device may use the address for communication. In embodiments, an address provider may comprise a HA. A MIP device refers to any device that utilizes mobile internet protocol to communicate with other devices. Such MIP devices may include, for example, a mobile telephone, a portable digital assistant (PDA), a laptop, a global positioning system (GPS), an MP3 player, or any other portable device.

Often times, in a wireless MIP network utilizing the dynamic assignment approach, an address provider, such as a HA, may not be optimally operating. By way of example only, the address provider may incur a loss of connectivity, a full capacity, an unavailability of addresses to assign, an unavailable point of attachment, and the like. Accordingly, the address provider may fail to provide an address, such as an IP address, for the MIP device to use for communication. Notwithstanding the failure of an address provider to provide an address, the deficient address provider may be repeatedly selected to provide an address for a MIP device to communicate. For example, assume a FA receives a request for an address that indicates a preference for dynamic HA assignment. Thereafter, the FA may select a deficient HA to provide an address for a MIP device. A deficient HA may refer to an HA that fails to provide an address. Such a deficient HA may include a defective HA or an HA that does not receive requests for addresses. Assume further that the selected HA fails to provide an address and the FA again receives an address request indicating a dynamic HA assignment. As such, the same deficient HA may, again, be selected by the FA to provide an address for the MIP device. Because the FA may select any HA without restriction, an HA that fails to provide an address may be repeatedly selected. As such, an MIP device desiring to communicate via a network may repetitively receive errors.

As shown in FIG. 2, an exemplary computing system 200 includes an address-request initiator module 210, an address-provider selector module 220, and an address-request failover module 230. In some embodiments, one or more of the illustrated modules may be implemented as one or more stand-alone applications. In other embodiments, one or more of the illustrated modules may be integrated directly into the operating system or an application of a server and/or an end-user device. It will be understood by those of ordinary skill in the art that the modules illustrated in FIG. 2 are exemplary in nature and in number and should not be construed as limited. Any number of modules may be employed to achieve the desired functionality within the scope of embodiments hereof. Further, modules may be located on any number of servers or computing devices.

The address-request initiator module 210 is configured to initiate a request for an address for a session. As used herein, the term "address" refers to an address that enables a MIP device to communicate over a computer network. Such an address may be an IP address. The address-request initiator module 210 may utilize an address request to request an address. For example, the address-request initiator module 210 may use an address request to request an address from a HA. In one embodiment, the address-request initiator module 210 may reside on a MIP device.

In one embodiment, an address-request initiator module 210 may include the following components: an address-request generator 212 and an address-request communicator 214. In some embodiments, one or more of the illustrated components may be implemented as one or more stand-alone applications. In other embodiments, one or more of the illustrated components may be integrated directly into the operating system or an application of a server and/or an end-user device. It will be understood by those of ordinary skill in the art that the components illustrated in FIG. 2 are exemplary in nature and in number and should not be construed as limited. Any number of components may be employed to achieve the desired functionality within the scope of embodiments hereof. Further, components may be located on any number of servers or computing devices.

The address-request generator 212 is configured to generate an initial address request for a session. As used herein, an address request provides a request for an address, such as an IP address, that enables communication over a computer network. An address request may comprise, for example, a registration request or a MIP registration request. In one embodiment, an address request may include, among other things, a dynamic indicator and a failover counter (discussed hereinafter). In addition to an address-provider field, an address request may also include other fields, such as a source address, a destination address, care-of-addresses, and the like.

A dynamic indicator, as used herein, indicates the desire for a dynamic address-provider assignment (e.g., dynamic HA assignment). Such a dynamic indicator may be an IP address, such as an all-zeros address (e.g., 000.000.000.000) or an all-ones address (e.g., 255.255.255.255). An all-zeros address refers to an IP address of 0.0.0.0. where each of the octets, i.e., eight bit sections, in binary notation include all zeros (e.g., 00000000.00000000.00000000.00000000). An all-ones address refers to an IP address of 255.255.255.255 where each of the octets in binary notation include all ones (e.g., 11111111.11111111.11111111). In embodiments, an address request may include an address-provider field. Rather than identifying an address provider (e.g., an IP address of the address provider, such as 2.2.2.2) within the address provider field, the address-request generator 212 may provide a dynamic indicator within the address-provider field to indicate the desire for a dynamic address-provider assignment.

In one embodiment, the address-request generator 212 may utilize any dynamic indicator to indicate the desire for dynamic address-provider assignment. For example, in one instance, the address-request generator 212 may utilize an all-zeros address as the dynamic indicator and, as such, populate the address-provider field with 0.0.0.0. In a subsequent instance, the address-request generator 212 may utilize an all-ones address as the dynamic indicator and, accordingly, populate the address-provider field with 255.255.255.255. Alternatively, the address-request generator 212 may utilize the same dynamic indicator with each request to indicate the desire for dynamic address-provider assignment. For example, in one instance, the address-request generator 212 may utilize an all-zeros address as the dynamic indicator and, as such, populate the address-provider field with 0.0.0.0. In a subsequent instance, the address-request generator 212 may again utilize an all-zeros address as the dynamic indicator and, accordingly, again populate the address-provider field with 0.0.0.0.

A failover counter is a unique identifier that is associated with the number of instances an address has been requested (e.g., RRQ) for a session. Such a failover counter may comprise a retry counter. A failover counter may be included within a failover counter field. In one embodiment, a failover counter may comprise a header field, header extension, or an additional non-vendor specific extension. A failover counter may indicate the number of instances an address has been requested for a session or, alternatively, the number of instances a failover address has been requested for a session. In some embodiments, a session may refer to a successful binding of a MIP device to an address-provider selector module (e.g., a FA). In one embodiment, a failover counter is a unique number that indicates the number of instances an address has been requested for a session. Such a failover counter may be incremented (e.g., by one) each time the number of instances an address has been requested for a session increases. For example, in the initial address request, the failover counter may be set to zero. Thereafter, in providing a failover address request, the failover counter may be incremented by one so that it is set to one. One skilled in the art will recognize that the failover counter in the initial address request may be set to any value (e.g., 1, 100, 0.1 and the like) and may increment by any value. In some embodiments, an increment may be present, predefined, or dynamically defined.

The address-request generator 212 may generate an initial address request for a session automatically or based on an indication. Where an address request is automatically generated, the generation may occur upon the occurrence of a time, a time period, or an event. Such an event may include, for example, a computer startup, a computer logon, an application logon, a disconnected internet connection, and the like. Alternatively, a user or an application may indicate a desire to request an address to enable communication over a network. In an instance where a user provides an indication to generate an address request, the user may select an icon, or the like. In some cases, the user may be required to enter a username, a password, or a combination thereof.

The address-request communicator 214 is configured to communicate address requests. In one embodiment, the address-request communicator 214 may communicate address requests to an address-provider selector, such as a FA. An address-provider selector, as used herein, selects an address provider, such as a HA, to provide an address for communicating within a network. In one embodiment, an address-provider selector may comprise a FA, an AAA, or a combination thereof.

The address-provider selector module 220 is configured to select one or more address providers. The address-provider selector module 220 may reside, for example, within a FA, an AAA, or a combination thereof. In one embodiment, the address-provider selector module 220 may include the following components: an address-request obtainer 222, a failover-counter associater 224, an address-provider assignor 226, and an address-request communicator 228. In some embodiments, one or more of the illustrated components may be implemented as one or more stand-alone applications. In other embodiments, one or more of the illustrated components may be integrated directly into the operating system or an application of a server and/or an end-user device. It will be understood by those of ordinary skill in the art that the components illustrated in FIG. 2 are exemplary in nature and in number and should not be construed as limited. Any number of components may be employed to achieve the desired functionality within the scope of embodiments hereof. Further, components may be located on any number of servers or computing devices.

The address-request obtainer 222 is configured to obtain address requests. Address-request obtainer 222 may obtain address requests by receiving, retrieving, identifying, determining, or generating the address requests. In one embodiment, such an address request may be received from an address requester module, such as address-request initiator module 210 or address-request failover module, residing on a MIP device.

The failover-counter associater 224 is configured to associate a failover counter within an address request with one or more address providers. The failover-counter associater 224 may utilize a lookup table or an algorithm to associate dynamic indicators with one or more address providers. In some embodiments, each failover counter may be associated with one or more distinct address providers. For instance, a failover counter equal to one may be associated with an address provider having an IP address of 2.2.2.2, and a failover counter equal to two may be associated with an address provider having an IP address of 3.3.3.3. In some embodiments, failover-counter associater 224 may also be configured to identify the failover-counter within address requests so that failover-counter associater 224 may, thereafter, associate the dynamic indicator with one or more address providers.

In one embodiment, a failover counter may be associated with a single address provider. By way of example, a failover counter equal to one may be associated with a specific address provider, such as address provider having an IP address of 2.2.2.2. In such a case, each instance the failover counter equal to one is obtained by address-request obtainer 222, the address request may be communicated to the address provider having an IP address of 2.2.2.2.

In another embodiment, a failover counter may be associated with multiple address providers. By way of example, a failover counter equal to one may be associated with a set of address providers, such as a first address provider having an IP address of 2.2.2.1, a second address provider having an IP address of 2.2.2.2, and a third address provider having an IP address of 2.2.2.3. In such an embodiment, an address request having a failover counter equal to one obtained by address-request obtainer 222 may be communicated to any one of the associated address providers. Accordingly, in one instance, such an address request may be communicated to a first address provider having an IP address of 2.2.2.1. In another instance, such an address request may be communicated a second address provider having an IP address of 2.2.2.2.

The address-provider assignor 226 is configured to assign the address request to an address provider. The address-provider assignor 226 may assign the address request to one of the one or more address providers associated with the failover counter presented within the address request. By way of example only, assume an address request having a failover counter equal to two is obtained by address-request obtainer 222 and associated with a set of address providers including a first address provider having an IP address of 2.2.2.1 and a second address provider having an IP address of 2.2.2.2. In such a case, the address-provider assignor 226 may assign the address request to any one of the address providers associated with the failover counter, such as the first address provider having an IP address of 2.2.2.1.

Where a plurality of address providers are associated with the failover counter, in one embodiment, the address-provider assignor 226 may randomly assign the address request to one of the associated address providers. Alternatively, the address-provider assignor 226 may be configured to selectively assign the address request to one of the associated address providers via an algorithm, a lookup table, or the like. For example, the address-provider assignor 226 may assign the address request to the associated address provider having the least utilization, the most addresses available for communication, the preferred load balance results, or the like.

In one embodiment, the address-provider assignor 226 may assign the address request to an address provider that was not previously utilized to request a session. As such, where the same group of address providers is associated with the failover counter in different instances (e.g., the failover counter cycles) the failover counter may be assigned with a different address provider within the group of addresses in each instance. In such an embodiment, the address providers assigned to the address requests may be monitored so as to avoid repetitively assigning an address request to a particular address provider within a group of address providers. An address-provider selector module or other module/component may monitor the assigned address providers.

Assigning the address request to an address provider may include, for example, adding to or modifying the address request. In such a case, an address-provider identifier, such an IP address of the address-provider, may be included within the address request. In one embodiment, such an address-provider identifier may be added to the address request. Alternatively, the address request may be modified such that an address-provider identifier may replace, for example, the destination address within the destination-address field of the address request. In another embodiment, assigning the address request to an address provider may include generating a new address request having an address-provider identifier.

The address-request communicator 228 is configured to communicate the address request to an address provider such as, for example, a HA. In one embodiment, the address-request communicator 228 may communicate the address request to the address provider assigned by address-provider assignor 226.

One skilled in the art will recognize that the invention includes an improved an address-provider selector (e.g., FA) capable of selecting an address provider that provides mobile internet protocol devices with internet protocol addresses for data communications. The improved address-provider selector comprising an address request obtaining means for obtaining an address request having a dynamic indicator and a first failover counter; an associating means for associating the first failover counter with one or more first address providers; an assigning means for assigning the address request to one of the one or more first address providers associated with the first dynamic indicator; and a communication means for communicating the address request to the assigned address provider. In one embodiment, the means for obtaining an address request having a dynamic indicator and a first failover counter may comprise an address-request obtainer 222. In one embodiment, the means for associating the first failover counter with one or more first address providers may comprise a failover-counter associater 224. In one embodiment, the means for assigning the address request to one of the one or more first address providers associated with the first dynamic indicator may comprise an address-provider assignor 226. In one embodiment, the means for communicating the address request to the assigned address provider may comprise an address-request communicator.

In response to receiving and processing the address request, the address provider, such as a HA, may communicate an address reply. An address reply, as used herein, comprises a response to an address request. Such an address reply may include an address for use by the MIP device to communicate. Alternatively, the address reply may include an error code indicating that the address provider was unable to obtain an address for use by the MIP device to communicate. In embodiments, the address provider may communicate the address reply to an address-provider selector (e.g., a FA or AAA, an MIP device, or the like).

The address-request failover module 230 is configured to provide an address request, if necessary. The address-request failover module 230 may, for example, reside within a MIP device. In one embodiment, the address-request failover module 230 may include the following components: an address-reply obtainer 232, a failover address-request provider 234, and a failover address-request communicator 236. In some embodiments, one or more of the illustrated components may be implemented as one or more stand-alone applications. In other embodiments, one or more of the illustrated components may be integrated directly into the operating system or an application of a server and/or an end-user device. It will be understood by those of ordinary skill in the art that the components illustrated in FIG. 2 are exemplary in nature and in number and should not be construed as limited. Any number of components may be employed to achieve the desired functionality within the scope of embodiments hereof. Further, components may be located on any number of servers or computing devices.

The address-reply obtainer 232 is configured to obtain an address reply. Such an address reply may be provided by an address provider (e.g., a HA). One skilled in the art will recognize that an address reply obtained by address-reply obtainer 216 may be received from an address provider (e.g., a HA) or an address-provider selector (e.g., a FA). In an embodiment where the address reply is received from an address-provider selector, the address reply may be communicated from an address provider to the address-provider selector. The address-provider selector (e.g., a FA) may then relay the address reply to the address-reply obtainer 216, such as an address-reply obtainer 216 residing within an MIP device.

The address reply may include, as previously mentioned, an address for use by the MIP device to communicate or an error code indicating that the address provider failed to obtain an address for the MIP device to use for communication. In an instance where the address-reply obtainer 232 obtains an address reply having an address for use by the MIP device, the MIP device may utilize the address to communicate over a network. In an instance where the address-reply obtainer 232 obtains an address reply having an error code, however, a failover address-request provider 234 may provide another address request to obtain an address for communication, i.e., failover.

The failover address-request provider 234 is configured to provide a failover address request. As used herein, a failover address request refers to an address request utilized upon the failure of an address provider to provide an address for communication. Such a failover address request provides a request for an address that enables communication over a computer network. In some embodiments, the failover address-request provider 234 may generate a failover address request, modify the initial address request generated by, for example, address-request generator 212 such that a failover address request results, or otherwise modify the address reply such that a failover address request results.

A failover address request may comprise, for example, a registration request (RRQ) or a MIP registration request. In one embodiment, a failover address request may include, among other things, a dynamic indicator that indicates the desire for dynamic address-provider assignment (e.g., dynamic HA assignment) and a failover counter that is associated with the number of instances an address has been requested for a session. In addition to an address-provider field, a failover address request may also include other fields, such as a source-address field, a destination-address field, care-of-address fields, and the like.

In embodiments, a failover address request may include an address-provider field. Rather than identifying an address provider (e.g., an IP address of the address provider, such as 2.2.2.2) within the address-provider field, the failover address-request provider 234 may provide a dynamic indicator within the address-provider field to indicate the desire for a dynamic address-provider assignment. In one embodiment, the failover address-request provider 234 may utilize any dynamic indicator to indicate the desire for dynamic address provider assignment (e.g., an all-ones dynamic address or an all-zeros dynamic address). In addition to an address-provider field, a failover address request may also include other fields, such as a source address, a destination address, care-of-addresses, and the like.

A failover address request may also comprise a failover counter. Such a failover counter may be included within a failover counter field. In one embodiment, a failover counter field may comprise a header extension. A failover counter may indicate the number of instances an address has been requested for a session or, alternatively, the number of instances a failover address has been requested for a session.

In providing failover address requests, the failover address-request provider 234 may use a lookup table or an algorithm to determine a failover counter to include with a failover address request. Because the failover counter utilized in the initial address request generated by, for example, address-request generator 212 resulted in an error, such a lookup table or algorithm may be used to determine a different failover counter to use in the failover address request. In one embodiment, the failover address-request provider 234 may identify, recognize, or determine the failover counter used in the previous address request or address requests. In such an embodiment, the failover address-request provider 234 may then utilize a second failover counter that is unique from the first failover counter used in the previous address request or requests. For example, assume an initial address request includes a failover counter equal to zero, and the address-request obtainer 222 receives an error within the address reply. As such, the failover address-request provider 234 may recognize that the error was associated with the previously used failover counter and, thereby, select to provide a failover address request having a failover counter equal to one.

In one embodiment, a failover counter is a unique number that indicates the number of instances an address has been requested for a session. Such a failover counter may be incremented (e.g., by one) each time the number of instances an address has been requested for a session increases. For example, in the initial address request, the failover counter may be set to zero. Thereafter, in providing a failover address request, the failover counter may be incremented by one so that it is set to one. One skilled in the art will recognize that the failover counter in the initial address request may be set to any value (e.g., 1, 100, 0.1, and the like) and incremented by any value.

In one embodiment, the failover counter may continue indefinitely. That is, for example, each time the number of instances an address has been requested for a session increases, the failover counter may also increase. As such, a failover counter set at zero for an initial address request may be equal to ten after an address has been requested in ten instances. In another embodiment, the failover counter may cycle based on a number of instances an address has been requested. The number of instances may be preset, predefined, or dynamically defined. For example, assume a failover counter cycles after three requests for an address, and the failover of an initial address request may be set to one. Upon receiving a first error code, the failover counter of a second address request may be increased to two. After receiving a second error code, the failover counter of a third address request may be increased to three. Accordingly, because three requests for an address have been communicated, upon receiving a third error code, the failover counter of the fourth address request may return to one. One skilled in the art will recognize that, in one embodiment, upon the completion of a first session, the failover counter may reset and return to an initial value (e.g., zero) for an initial address request for a second session. In embodiments, the failover address-request provider 234 may be configured to modify the failover counter within a failover address request so that the failover counter represents number of requests for an address for a session.

The failover address-request provider 234 may provide a failover address request automatically or based on an indication. Where a failover address request is automatically generated, the generation may occur upon the occurrence of a time, time period, or event (e.g., the receipt of an address reply having an error). Alternatively, a user or an application may indicate a desire to request an address to enable communication over a network.

The failover address-request communicator 236 is configured to communicate the failover address-request. In one embodiment, the failover address-request communicator 236 may communicate the failover address-request to an address-provider selector, such as a FA. One skilled in the art will recognize that failover address-request communicator 236 may be the same component as address-request communicator 214.

Figure 3:
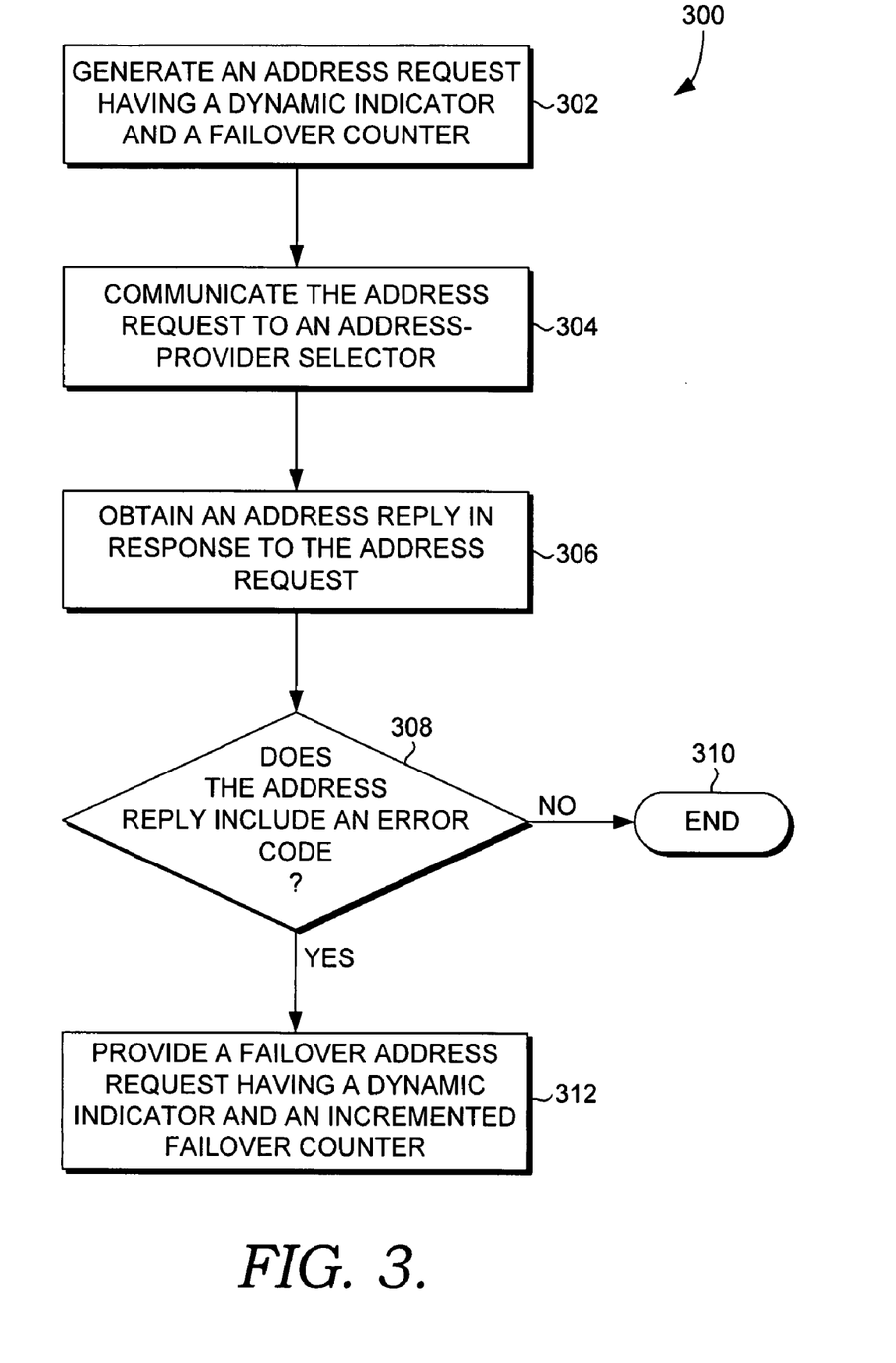
FIG. 3 is an exemplary flow diagram illustrating an exemplary method for providing an address request, in accordance with an embodiment of the present invention.

Turning now to FIG. 3, a flow diagram is shown illustrating a method 300 for providing address requests, in accordance with an embodiment of the present invention. Initially, as indicated at block 302, an address request having a dynamic indicator and a failover counter is generated. Subsequently, at block 304, the address request is communicated to an address-provider selector. Such an address provider selector may comprise a FA. As indicated at block 306, an address reply communicated in response to the address request is obtained. Thereafter, at block 308, it is determined if the address reply includes an error code. If it is determined that the address reply does not include an error code, the method ends at block 310. In one embodiment, upon obtaining a successful address, the FA may create a binding to the MIP device. If, however, it is determined that the address reply does include an error code, a failover address request having a dynamic indicator and an incremented failover counter is provided. This is indicated at block 312. Such an incremented failover counter (e.g., incremented value) refers to the previous failover counter (e.g., a value) plus an increment. For example, assuming a previous failover counter equals one and an increment value equals one, an incremented failover counter equals two. The increment may be any value preset, predefined, or dynamically defined.

Upon providing a failover address request having a dynamic indicator and a second failover counter, iterations including blocks 304 through 312 may continue until the address reply does not include an error code (e.g., an address is successfully obtained). One skilled in the art will recognize that each iteration may result in providing a failover address request having a different incremented failover counter (e.g., in a first instance an incremented failover counter may equal one, in a second instance an incremented failover counter may equal two, etc). By way of example only, an address request having a failover counter equal to zero may be generated at block 302 and communicated to an address-provider selector at block 304. At block 306, an address reply communicated in response to the address request may be obtained at block 308. Assuming the address reply includes an error code, a failover address request having a failover counter equal to two is provided at block 312. The failover address request may be communicated at block 304 to an address-provider selector. An address reply communicated in response to the failover address request may be obtained at block 306. Assuming the address reply includes an error code, a failover address request having a failover counter equal to three may be provided.

Figure 4:
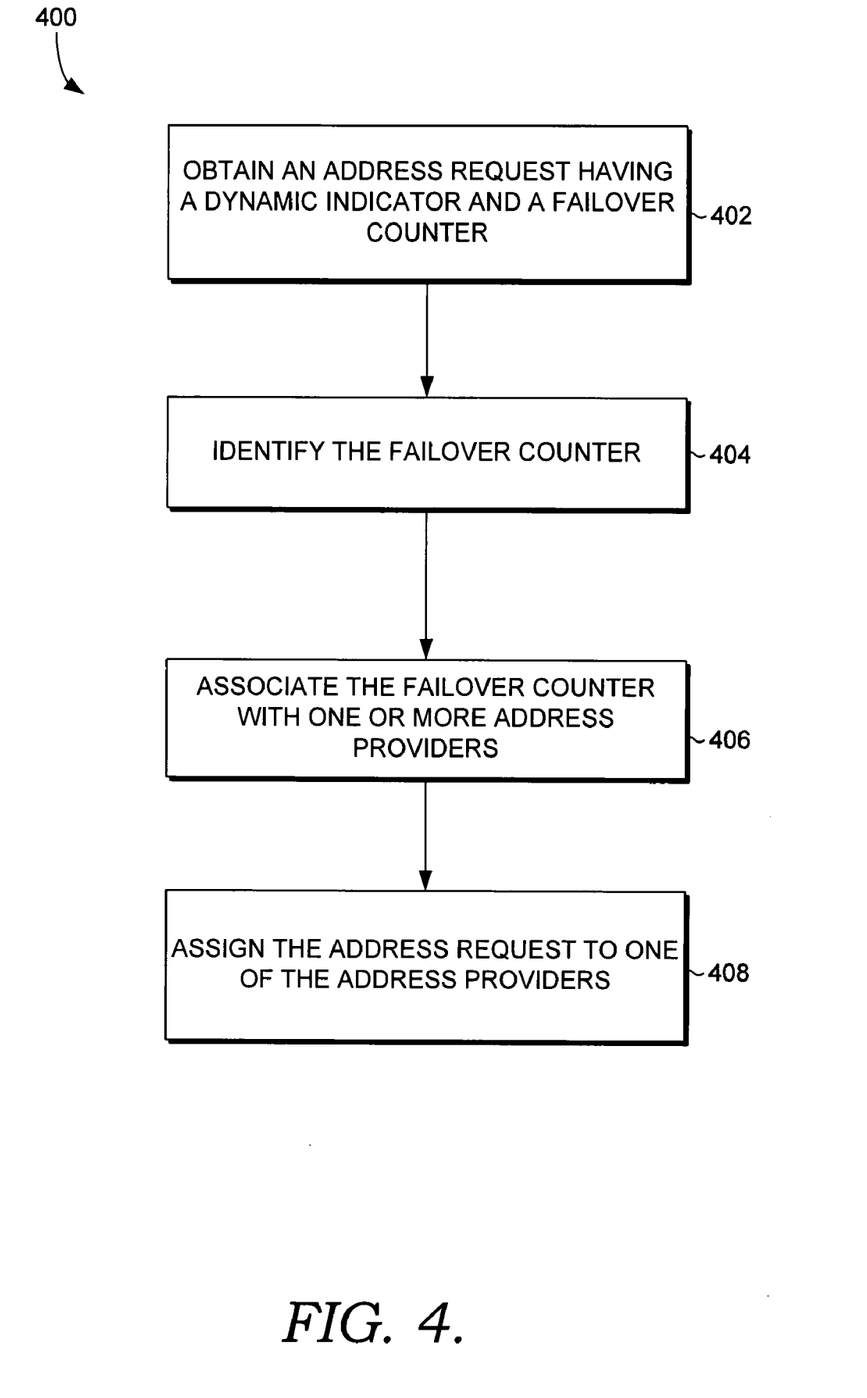
FIG. 4 is an exemplary flow diagram illustrating an exemplary method for selecting an address provider, in accordance with an embodiment of the present invention.

With reference to FIG. 4, a flow diagram is shown illustrating a method 400 for selecting an address provider, in accordance with an embodiment of the present invention. Initially, as indicated at block 402, an address request having a dynamic indicator and a failover counter is obtained. Subsequently, at block 404, the failover counter is identified. The failover counter is associated with one or more address providers at block 406. Thereafter, at block 408, the address request is assigned to one of the one or more address providers associated with the failover counter.

Figure 5:
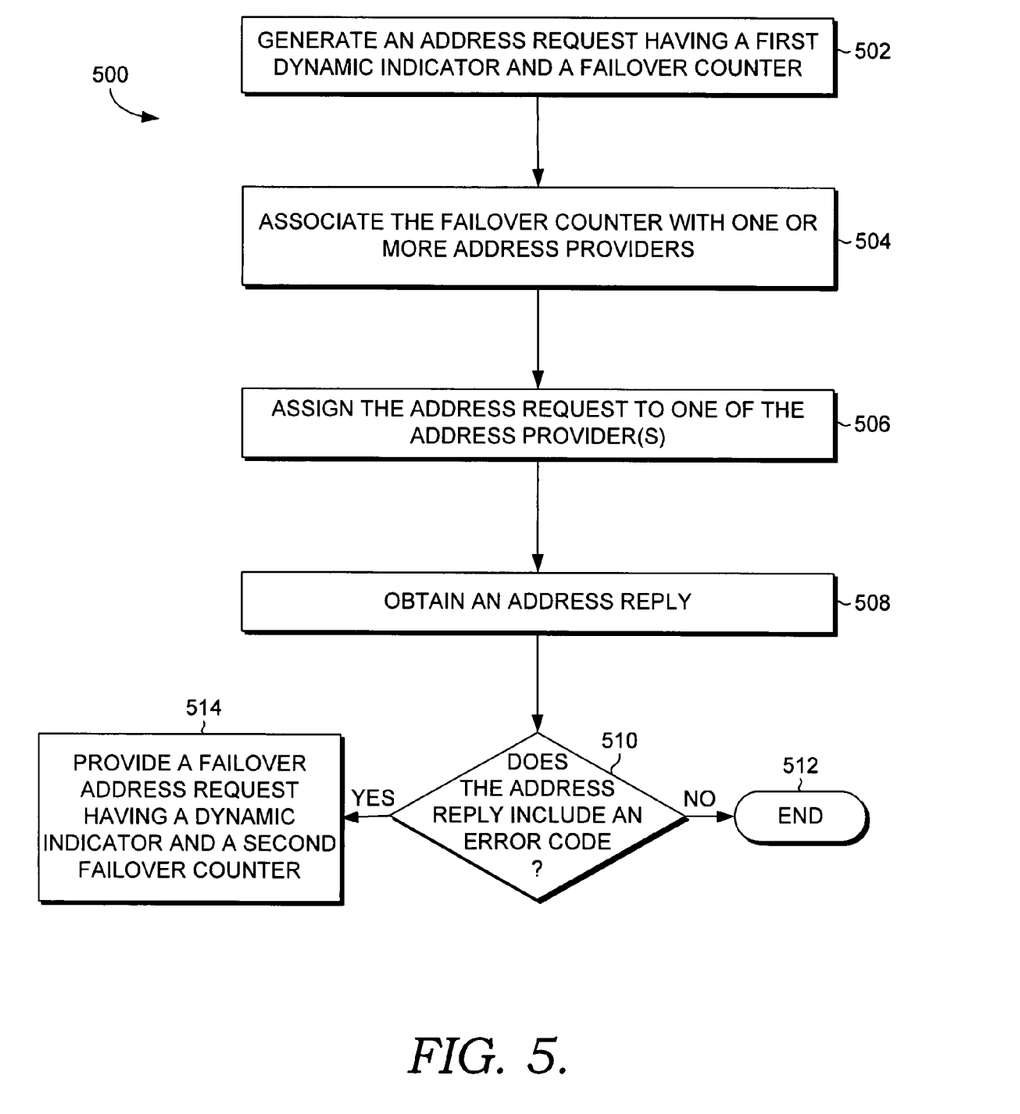
FIG. 5 is an exemplary flow diagram illustrating an exemplary method for providing an address request and selecting an address provider, in accordance with an embodiment of the present invention.

Turning now to FIG. 5, a flow diagram is shown illustrating a method 500 for providing address requests and selecting an address provider. Initially, as indicated at block 502, an address request having a dynamic indicator and a failover counter is generated. Subsequently, at block 504, the failover counter is associated with one or more first address providers. The address request is assigned to one of the one or more first address providers. This is indicated at block 506. In response to the address request, an address reply is obtained at block 508. Thereafter, at block 510, it is determined if the address reply includes an error code. If it is determined that the address reply does not include an error code, the method ends at block 512. If, on the other hand, it is determined that the address reply includes an error code, a failover address request having a dynamic indicator and a second failover counter that is different from the first failover counter is provided. This is indicated at block 514.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more computer-readable storage media having computer-executable instructions embodied thereon that, when executed perform a method for selecting address providers that provide mobile internet protocol devices with addresses to use for communication, the method comprising:
    obtaining an address request having a dynamic indicator and a failover counter indicating a number of instances an address has been requested for a session;
    associating the failover counter with one or more address providers based on the number of instances the address has been requested for a session; and
    communicating the address request to one of the one or more address providers associated with the failover counter.

2. The media of claim 1 further comprising assigning the address request to the one of the one or more address providers associated with the failover counter.

3. The media of claim 2, wherein assigning the address request to one of the one or more address providers associated with the failover counter comprises populating the address request with an indication of the one of the one or more address providers.

4. The media of claim 1, wherein the dynamic indicator indicates a preference for a dynamic address-provider assignment, wherein the dynamic address-provider assignment comprises a dynamic home agent assignment.

5. The media of claim 1, wherein the one or more address providers comprise one or more home agents.

6. The media of claim 1, wherein a first failover counter is associated with a first set of one or more address providers, a second failover counter is associated with a second set of one or more address providers, and a third failover counter is associated with a third set of one or more address providers.

7. The media of claim 1, wherein the address request comprises an initial address request or a failover address request.

8. One or more computer-readable storage media having computer-executable instructions embodied thereon that, when executed perform a method for selecting address providers that provide mobile internet protocol devices with addresses, the method comprising:
    receiving at a mobile device an address reply in response to a first address request having a dynamic indicator and a first failover counter,
    wherein when the address reply indicates an error, communicating from the mobile device a second address request having the dynamic indicator and a second failover counter.

9. The media of claim 8 further comprising generating the first address request having the dynamic indicator and the first failover counter.

10. The media of claim 8, wherein the first failover counter comprises a value and the second failover counter comprises an incremented value.

11. The media of claim 10, wherein the incremented value is predetermined.

12. The media of claim 8, wherein the second failover counter indicates a number of requests for an address for a session.

13. The media of claim 8, wherein the dynamic indicator indicates a preference for a dynamic address-provider assignment.

14. The media of claim 8 further comprising incrementing the first failover counter by one to obtain the second failover counter.

15. The media of claim 8 further comprising providing the second address request having the dynamic indicator and the second failover counter.

16. One or more computer-readable media having computer-executable instructions embodied thereon that, when executed perform a method for selecting address providers that provide mobile internet protocol devices with addresses to use for communication, the method comprising:
    obtaining a first address request having a first failover counter indicating a first number of instances an address has been requested for a session;
    in accordance with the first number of instances the address has been requested for the session, associating the first failover counter with a set of one or more first address providers;
    assigning the first address request to one of the set of one or more first address providers associated with the first failover counter;
    communicating the first address request to the assigned address provider;
    obtaining a second address request having a second failover counter indicating a second number of instances the address has been requested for the session;
    in accordance with the second number of instances the address has been requested for the session, associating the second failover counter with a set of one or more second address providers;
    assigning the second address request to one of the set of one or more second address providers associated with the second failover counter; and communicating the second address request to the one of the set of one or more second address providers associated with the second failover counter.

17. The media of claim 16, wherein the set of one or more first address providers comprise home agents.

18. The media of claim 16, wherein the first address request comprises an initial address request and the second address request comprises a failover address request.

19. The media of claim 16 further comprising obtaining an address reply.

20. The media of claim 16 further comprising identifying a first dynamic indicator within the first address request.

* * * * *